(12) United States Patent
Park et al.

(10) Patent No.: US 7,873,360 B2
(45) Date of Patent: *Jan. 18, 2011

(54) SOFT HANDOFF SYSTEM, MOBILE TERMINAL HAVING THE SAME, AND SOFT HANDOFF METHOD

(75) Inventors: Young-Jin Park, Seoul (KR); Kyung-Soo Han, Seoul (KR)

(73) Assignee: Pantech & Curitel Communications, Inc., Seoul (KR)

( * ) Notice: Subject to any disclaimer, the term of this patent is extended or adjusted under 35 U.S.C. 154(b) by 194 days.

This patent is subject to a terminal disclaimer.

(21) Appl. No.: 12/185,355

(22) Filed: Aug. 4, 2008

(65) Prior Publication Data

US 2008/0287133 A1 Nov. 20, 2008

Related U.S. Application Data (63) Continuation of application No. 11/236,519, filed on Sep. 28, 2005, now Pat. No. 7,424,297.

(30) Foreign Application Priority Data

Oct. 6, 2004 (KR) ................ 10-2004-0079632

(51) Int. Cl.
*H04Q 7/20* (2006.01)
(52) U.S. Cl. ............... 455/442; 455/67.13; 455/226.2
(58) Field of Classification Search ......... 455/436–439, 455/442; 370/331–333
See application file for complete search history.

(56) References Cited

U.S. PATENT DOCUMENTS

| | | | |
|---|---|---|---|
| 6,055,428 A | 4/2000 | Soliman | |
| 6,337,983 B1 | 1/2002 | Bonta et al. | |
| 6,337,984 B1 | 1/2002 | Hong et al. | |
| 7,054,631 B2 | 5/2006 | Tee | |
| 2001/0051524 A1 | 12/2001 | Hunzinger | |
| 2006/0007862 A1 | 1/2006 | Sayeedi et al. | |
| 2006/0256753 A1 | 11/2006 | Chang | |
| 2007/0002799 A1 | 1/2007 | Hunzinger | |

FOREIGN PATENT DOCUMENTS

CN 1444830 9/2003

OTHER PUBLICATIONS

European Search Report dated Feb. 16, 2006.
EIA/TIA Standards: "Mobile Station-Base Station Compatibility Standard for Dual-Mode Wideband Spread Spectrum Cellular, (Revision of TIA/EIA/IS-95), TIA/EIA/IS-95-A", EIA/TIA, 2003, XP002365570, USA, pp. 6.173-6.182, 6.228-6.229, 7.76-7.79, 7.106, 7.173-7.176, 7.199-7.204.
Office Action dated Oct. 10, 2007 (from co-pending U.S. Appl. No. 11/236,519).
Notice of Allowance dated May 20, 2008 (from co-pending U.S. Appl. No. 11/236,519).

*Primary Examiner*—Temica M Beamer
(74) *Attorney, Agent, or Firm*—H.C. Park & Associates, PLC (57) ABSTRACT

Disclosed are a soft handoff system, a soft handoff method, and a mobile terminal equipped with the soft handoff system. The soft handoff system for a mobile terminal analyzes periodically monitored wireless conditions of neighbor base stations, transmits a PSMM (Pilot Strength Measurement Message) to a current base station when a condition arises that needs reporting to the current base station, receives an HDM (Handoff Direction Message) from the current base station, wherein upon receiving the HDM from the current base station, the system allows a handoff drop timer of an active base station belonging to an active set having a pilot channel signal strength less than a predetermined value to continue running rather than to be reset until the handoff drop timer expires.

21 Claims, 4 Drawing Sheets

SOFT HANDOFF SYSTEM, MOBILE TERMINAL HAVING THE SAME, AND SOFT HANDOFF METHOD

CROSS REFERENCE TO RELATED APPLICATIONS

This application is a continuation application of U.S. patent application Ser. No. 11/236,519, filed on Sep. 28, 2005, which claims priority from and the benefit of Korean Patent Application No. 10-2004-0079632, filed on Oct. 6, 2004, which is are hereby incorporated by reference for all purposes as if fully set forth herein.

BACKGROUND OF THE INVENTION

1. Field of the Invention

The present invention relates to a soft handoff system, a mobile terminal equipped with the soft handoff system, and a soft handoff method, which can reduce call drop rate by allowing a handoff drop timer of a base station in an active set having poor signal quality to continue to run rather than to be reset when the mobile terminal receives a Handoff Direction Message (HDM) from a current base station in a traffic state.

2. Description of the Related Art

Handoff is the process in which a mobile terminal is handed from one cell to the next in order to maintain a radio connection with a corresponding communication network.

Figure 1:
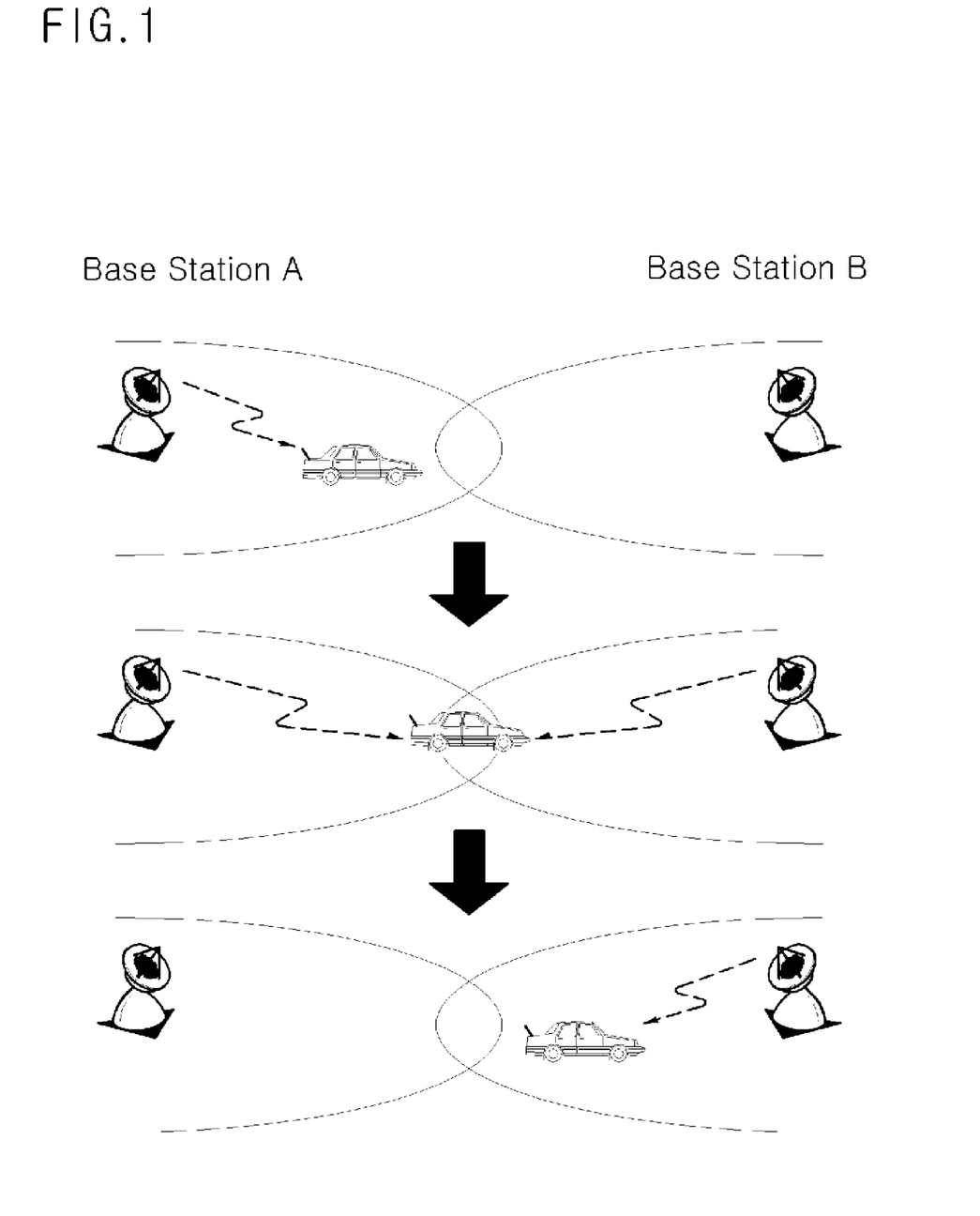
FIG. 1 is a schematic diagram showing a handoff process.

FIG. 1 is a schematic diagram showing a handoff process. As a mobile terminal moves from a base station "A" to a base station "B", the signal strength of the base station "B" increases whereas that of the base station "A" decreases. In order to continue an ongoing call of the mobile terminal without interruption, it is necessary to transfer a traffic channel established with the mobile terminal from the base station "A" to the base station "B". When the mobile terminal is located midway between the two base stations "A" and "B", the signal strengths of the two base stations "A" and "B" are nearly equal. Accordingly, the traffic channel can be established between the mobile terminal and any one of the two base stations "A" and "B". At this time, handoff is performed.

The mobile terminal determines when to handoff. Since the mobile terminal constantly monitors whether it approaches to neighbor base stations, it constantly measures pilot channel signal strengths $E_c/I_o$ of neighbor base stations. This procedure is called "pilot searching". The mobile terminal constantly performs pilot searching while it is powered on, regardless of whether or not it is in communication.

A mobile terminal in communication analyzes periodically monitored wireless conditions (i.e., periodically measured signal strengths) of neighbor base stations, and transmits a Pilot Strength Measurement Message (PSMM) to a current base station if necessary.

Specifically, if the mobile terminal in communication determines that the pilot channel signal strength $E_c/I_o$ of a neighbor base station "B" is high enough (i.e., greater than a first threshold value T_ADD), the mobile terminal sends a PSMM to the current base station "A". The PSMM is a message containing information about the pilot channel signal strength $E_c/I_o$ of the new base station "B".

The current base station "A" checks the condition of the new base station "B" based on the PSMM received from the mobile terminal. If the current base station "A" determines that there is no problem in handoff to the new base station "B", the current base station "A" allocates a new traffic channel to the new base station "B", and then transmits a Handoff Direction Message (HDM), which is a message containing a command to perform handoff, to the mobile terminal.

The mobile terminal performs handoff operation upon receipt of the HDM from the current base station "A".

Specifically, when receiving the HDM, the mobile terminal allocates a traffic channel to each of the current and new base stations "A" and "B". In this case, the mobile terminal transmits a Handoff Completion Message (HCM), which indicates that the handoff operation has been successfully performed, to the current base station "A".

In the meantime, the mobile terminal constantly monitors pilot channel signal strengths $E_c/I_o$ of the current and new base stations "A" and "B". If it is determined that the pilot channel signal strength of the current base station "A" is low enough (i.e., less than a second threshold value T_DROP), the mobile terminal checks whether or not the pilot channel signal strength $E_c/I_o$ of the current base station "A" remains below the second threshold value T_DROP for a threshold interval T_TDROP. If the pilot channel signal strength $E_c/I_o$ of the current base station "A" remains below the second threshold value T_DROP for the threshold interval T_TDROP, the mobile terminal transmits a PSMM, which is a message containing information about the pilot channel signal strength $E_c/I_o$ of the new base station "B", to the current base station.

Upon receipt of the PSMM, the current base station "A" determines that the mobile terminal no longer requires a traffic channel established between the mobile terminal and the current base station, and then transmits an HDM to the mobile terminal after removing the traffic channel.

Upon receipt of the HDM, the mobile terminal removes the traffic channel established between the current base station "A" and the mobile terminal and transmits an HCM to the new base station "B", thereby completing the entire handoff process.

Meanwhile, in the conventional soft handoff method, when a mobile terminal receives an HDM from a base station, it resets a handoff drop timer in active set in which pilot channel signal strength $E_c/I_o$ is less than a predetermined value (for example, the second threshold value T_DROP).

Specifically, if a mobile terminal receives an HDM from a base station in active set in which pilot channel signal strength $E_c/I_o$ is less than the second threshold value T_DROP, the mobile terminal resets a handoff drop timer which is now in progress. Consequently, the mobile terminal tracks again the signal strength of the base station having poor signal quality for a threshold interval T_TDROP. Thus, it is not possible to immediately terminate a call connection to a base station having poor signal quality.

SUMMARY OF THE INVENTION

The present invention provides a soft handoff system, a mobile terminal equipped with the soft handoff system, and a soft handoff method, which can reduce call drop rate by allowing a handoff drop timer of a base station in an active set having poor signal quality to continue running rather than to be reset when the mobile terminal receives an HDM from a current base station in a traffic state.

In accordance with an aspect of the present invention, there is provided a soft handoff system for a mobile terminal, the system analyzing periodically monitored wireless conditions of neighbor base stations, transmitting a PSMM (Pilot Strength Measurement Message) to a current base station when a condition arises that needs reporting to the current base station, and receiving an HDM (Handoff Direction Message) from the current base station, wherein upon receiving the HDM from the current base station, the system allows a handoff drop timer of an active base station belonging to an active set having a pilot channel signal strength less than a predetermined value to continue running rather than to be reset until the handoff drop timer expires.

In accordance with another aspect of the present invention, there is provided a mobile terminal equipped with the soft handoff system.

The system may comprise: a monitoring unit for monitoring pilot channel signal strengths of neighbor base stations; a PSMM transmit unit for transmitting a PSMM of a new base station to the current base station when a pilot channel signal strength of the new base station detected by the monitoring unit is greater than a first threshold value T_ADD, and changing the new base station from a neighbor set to a candidate set; an HDM receive unit for receiving an HDM from the current base station which has allocated a traffic channel to the new base station according to the PSMM; a handoff unit for performing handoff operation by changing the new base station from the candidate set to the active set when receiving the HDM through the HDM receive unit, wherein the handoff unit allows a handoff drop timer of an active base station belonging to the active set having a pilot channel signal strength less than a second threshold value T_DROP to continue running rather than to be reset until the drop timer expires; an HCM (Handoff Completion Message) transmit unit for transmitting an HCM to the current base station when handoff operation is performed by the handoff unit; and a control unit for controlling the overall operation of the system.

While traffic channels are established between the mobile terminal and each of the current and new base stations by performing handoff operation, the handoff unit may start a drop timer of the current base station when the pilot channel signal strength of the current base station falls below the second threshold value T_DROP.

The handoff unit may transmit a PSMM to the current base station when the pilot channel signal strength of the current base station remains below the second threshold value T_DROP for a threshold interval T_TDROP of the drop timer of the current base station.

The handoff unit may receive the HDM from the current base station which has removed a traffic channel established between the current base station and the mobile terminal according to the PSMM, transmit an HCM to the new base station, and establish a traffic channel with the new base station.

The neighbor base stations whose pilot channel signal strengths are monitored by the monitoring unit may belong to the active set or the candidate set.

In accordance with another aspect of the present invention, there is provided a soft handoff method for a mobile terminal, in which periodically monitored wireless conditions of neighbor base stations are analyzed, a PSMM is transmitted to a current base station when a condition arises that needs reporting to the current base station, and an HDM received from the current base station, wherein upon receiving the HDM from the current base station, the mobile terminal allows a handoff drop timer of an active base station belonging to an active set having a pilot channel signal strength less than a predetermined value to continue running rather than to be reset until the handoff drop timer expires.

The method may comprise the steps of: monitoring pilot channel signal strengths of neighbor base stations by the mobile terminal; transmitting a PSMM of a new base station to the current base station when a pilot channel signal strength of the new base station detected by the mobile terminal is greater than a first threshold value T_ADD, and changing the new base station from a neighbor set to a candidate set; transmitting an HDM from the current base station to the mobile terminal after the current base station checks the condition of the new base station based on the PSMM received from the mobile terminal and allocates a traffic channel to the new base station if it is determined that there is no problem in handoff to the new base station; receiving the HDM from the current base station by the mobile terminal; performing handoff operation by changing the new base station from the candidate set to the active set by the mobile terminal having received the HDM from the current base station, wherein the mobile terminal allows a handoff drop timer of an active base station belonging to an active set having a pilot channel signal strength less than a second threshold value T_DROP to continue running rather than to be reset until the drop timer expires; and transmitting an HCM from the mobile terminal to the current base station when handoff operation is performed by the mobile terminal.

The step of performing handoff operation may further comprise starting a drop timer of the current base station when the pilot channel signal strength of the current base station falls below the second threshold value T_DROP, while traffic channels are established between the mobile terminal and each of the current and new base stations by performing handoff operation.

The step of performing handoff operation may further comprise transmitting a PSMM from the mobile terminal to the current base station when the pilot channel signal strength of the current base station remains below the second threshold value T_DROP for a threshold interval T_TDROP of the drop timer of the current base station.

The step of performing handoff operation may further comprise receiving the HDM from the current base station which has removed a traffic channel established between the current base station and the mobile terminal according to the PSMM, transmitting an HCM to the new base station, and establishing a traffic channel with the new base station.

In the step of monitoring, the neighbor base stations whose pilot channel signal strengths are monitored by the mobile terminal may belong to the active set or the candidate set.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Preferred embodiments of the present invention will now be described in detail with reference to the accompanying drawings.

In the following description, the term "active set" refers to a set of base stations currently communicating with a mobile terminal. The term "candidate set" refers to a set of base stations which do not currently communicate with the mobile terminal but have a sufficient pilot channel signal strength detected by the mobile terminal. The term "neighbor set" refers to a set of neighbor base stations that are known through a Neighbor List Message (NLM).

A soft handoff system in accordance with the present invention is implemented in the form of software incorporated and run in a mobile terminal. The soft handoff system analyzes periodically monitored wireless conditions (i.e., periodically measured signal strengths) of neighbor base stations, transmits a Pilot Strength Measurement Message (PSMM) to a current base station if necessary, and receiving a Handoff Direction Message (HDM) from the current base station. In this case, when the HDM is received from the current base station, the system allows a handoff drop timer of an active set having a pilot channel signal strength $E_c/I_o$ less than a predetermined value to continue to run rather than to be reset until the handoff drop timer expires.

Figure 2:
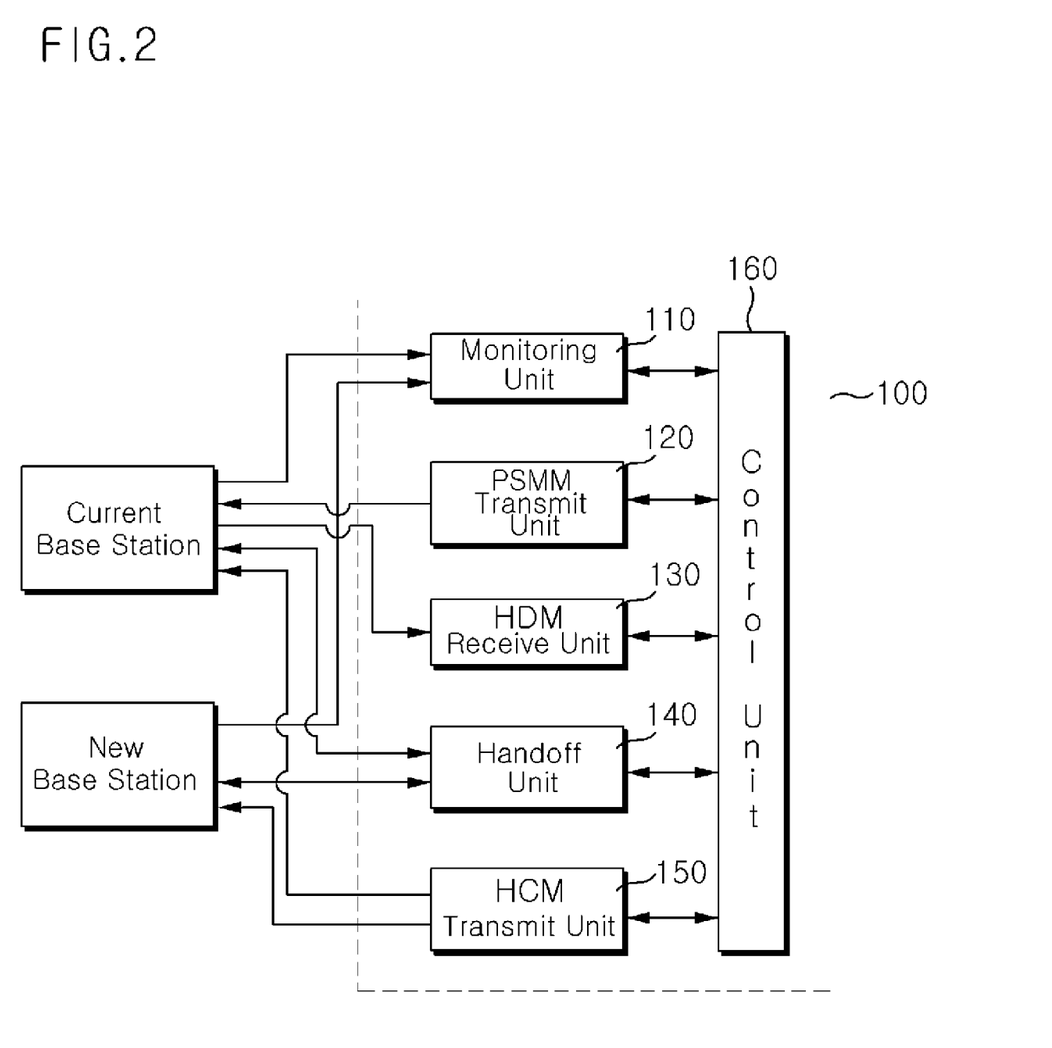
FIG. 2 is a block diagram showing a soft handoff system in accordance with the present invention.

FIG. 2 is a block diagram showing a soft handoff system according to the present invention.

A soft handoff system 100 includes a monitoring unit 110, a PSMM transmit unit 120, a HDM receive unit 130, a handoff unit 140, a HCM transmit unit 150, and a control unit 160.

The monitoring unit 110 monitors the pilot channel signal strength $E_c/I_o$ of neighbor base stations, which may be at least one of base stations belonging to the active set, candidate set, neighbor set, and remaining set.

That is, to check whether or not the mobile terminal approaches neighbor base stations, the soft handoff system 100 constantly monitors the pilot channel signal strengths $E_c/I_o$ of neighbor base stations through the monitoring unit 110 while the mobile terminal is powered on, regardless of whether or not the mobile terminal is in communication.

If a new base station having a pilot channel signal strength $E_c/I_o$ greater than a first threshold value T_ADD is detected by the monitoring unit 110, the PSMM transmit unit 120 transmits a PSMM of the new base station to a current base station, and changes the new base station from the neighbor set to the candidate set.

Specifically, if it is determined that the pilot channel signal strength $E_c/I_o$ of a neighbor base station (or a new base station) is high enough (i.e., greater than the first threshold value T_ADD), the mobile terminal in communication transmits a PSMM, which is a message containing information about the pilot channel signal strength $E_c/I_o$ of the new base station, to a current base station through the PSMM transmit unit 120. The mobile terminal then removes the new base station from the neighbor set and adds it to the candidate set.

The HDM receive unit 130 receives an HDM from the current base station after the current base station allocates a traffic channel to the new base station according to the PSMM.

Specifically, the current base station checks the condition of the new base station based on the PSMM received from the mobile terminal. If the current base station determines that there is no problem in handoff to the new base station, the current base station allocates a new traffic channel to the new base station, and then transmits an HDM, which is a message containing a command to perform handoff, to the mobile terminal. The soft handoff system 100 receives the HDM from the current base station through the HDM receive unit 130.

Upon receiving the HDM through the HDM receive unit 130, the handoff unit 140 performs handoff operation by changing the new base station from the candidate set to the active set. At this time, a handoff drop timer of an active base station belonging to the active set having a pilot channel signal strength $E_c/I_o$ less than a second threshold value T_DROP is not reset, but instead continues to run until the drop timer expires.

That is, when receiving the HDM from the current base station, the soft handoff system 100 performs handoff operation by removing the new base station from the candidate set and adding it to the active set.

Figure 3A:
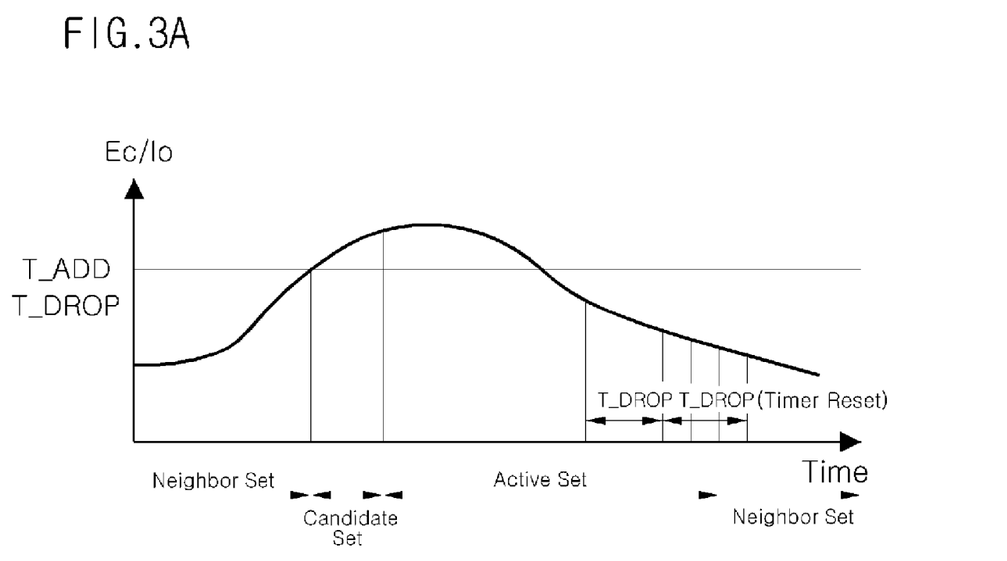
FIG. 3A is a graph showing a conventional operation of a handoff drop timer.
Figure 3B:
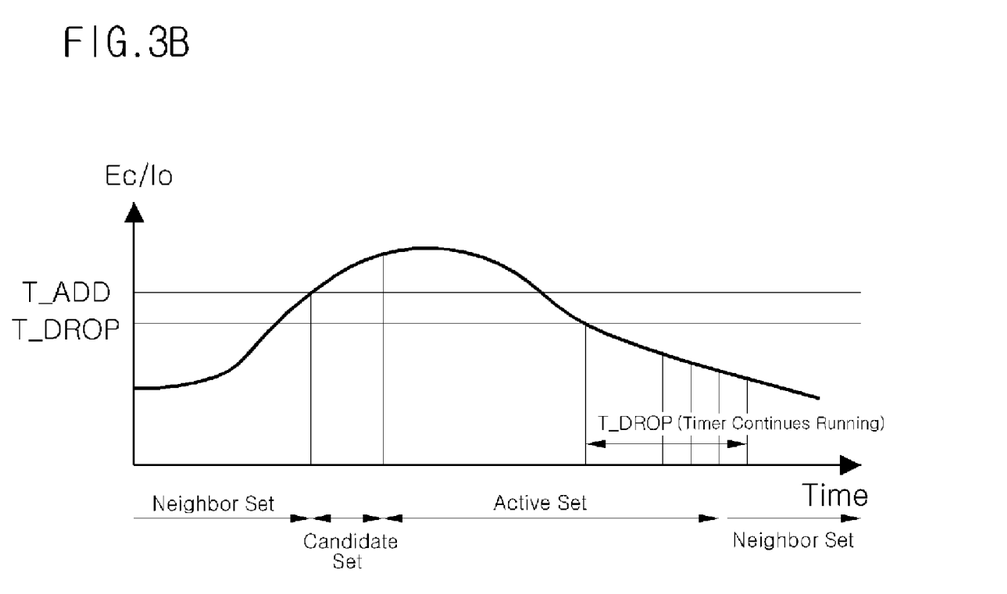
FIG. 3B is a graph showing operation of a handoff drop timer in accordance with the present invention.

Accordingly, upon receiving the HDM, a handoff drop timer of an active base station belonging to the active set having a pilot channel signal strength $E_c/I_o$ less than a second threshold value T_DROP is not reset differently from the conventional soft handoff method as shown in FIG. 3A, but instead continues to run until the drop timer expires as shown in FIG. 3B, thereby immediately terminating a call connection to a base station having poor signal quality and reducing call drop rate in a traffic state.

The HCM transmit unit 150 transmits an HCM to the current base station after the handoff unit 140 performs handoff operation.

Specifically, if the handoff unit 140 completes handoff operation, the soft handoff system 100 transmits an HCM, which indicates that handoff operation has been completed, to the current base station through the HCM transmit unit 150.

The control unit 160 controls the overall operation of the system, including the handoff operation.

Accordingly, when the mobile terminal receives an HDM, which is a message containing a command to perform handoff, from the current base station in a traffic state, the soft handoff system 100 allows the handoff drop timer of an active base station in the active set having poor signal quality to continue to run rather than to be reset, thereby making it possible to immediately terminate a call connection to the active base station having poor signal quality and improve call quality of the mobile terminal.

According to another embodiment of the present invention, while traffic channels are established between a mobile terminal and each of the current and new base stations by performing handoff operation, the handoff unit 140 starts the drop timer of the current base station when the pilot channel signal strength $E_c/I_o$ of the current base station falls below the second threshold value T_DROP.

Specifically, when the mobile terminal receives the HDM, traffic channels are established between the mobile terminal and each of the current and new base stations. In this case, the mobile terminal constantly monitors the pilot channel signal strength $E_c/I_o$ of each of the current and new base stations. If it is determined that the pilot channel signal strength $E_c/I_o$ of the current base station is low enough (i.e., lower than the second threshold value T_DROP), the mobile terminal starts the drop timer of the current base station.

The drop timer of the current base station is used to determine whether or not the pilot channel signal strength $E_c/I_o$ of the current base station remains below the second threshold value T_DROP for a threshold interval T_TDROP.

According to another embodiment of the present invention, if the pilot channel signal strength $E_c/I_o$ of the current base station remains below the second threshold value T_DROP for the threshold interval T_TDROP of the drop timer of the current base station, the handoff unit 140 transmits a PSMM to the current base station.

Specifically, the soft handoff system 100 determines whether or not the pilot channel signal strength $E_c/I_o$ of the current base station remains below the second threshold value T_DROP for the threshold interval T_TDROP. If the pilot channel signal strength $E_c/I_o$ of the current base station remains below the second threshold value T_DROP for the threshold interval T_TDROP, the soft handoff system 100 transmits a PSMM, which is a message containing information about the pilot channel signal strength $E_c/I_o$ of the new base station, to the current base station. Upon receipt of the PSMM, the current base station determines that the mobile terminal no longer requires a traffic channel established between the mobile terminal and the current base station, and then transmits an HDM, which is a message containing a command to perform handoff, to the mobile terminal after removing the traffic channel.

According to another embodiment of the present invention, the handoff unit 140 receives the HDM from the current base station after the current base station removes the traffic channel established between the current base station and the mobile terminal according to the PSMM, transmits an HCM to the new base station, and establishes a traffic channel with the new base station, thereby completing handoff to the new base station.

Specifically, upon receipt of the HDM from the current base station, the soft handoff system 100 removes the traffic channel established between the current base station and the mobile terminal through the handoff unit 140, transmits an HCM to the new base station, and establishes a traffic channel with the new base station, thereby completing handoff to the new base station. Consequently, a traffic channel assigned to the mobile terminal is switched from the current base station to the new base station, thereby completing the entire handoff process.

Figure 4:
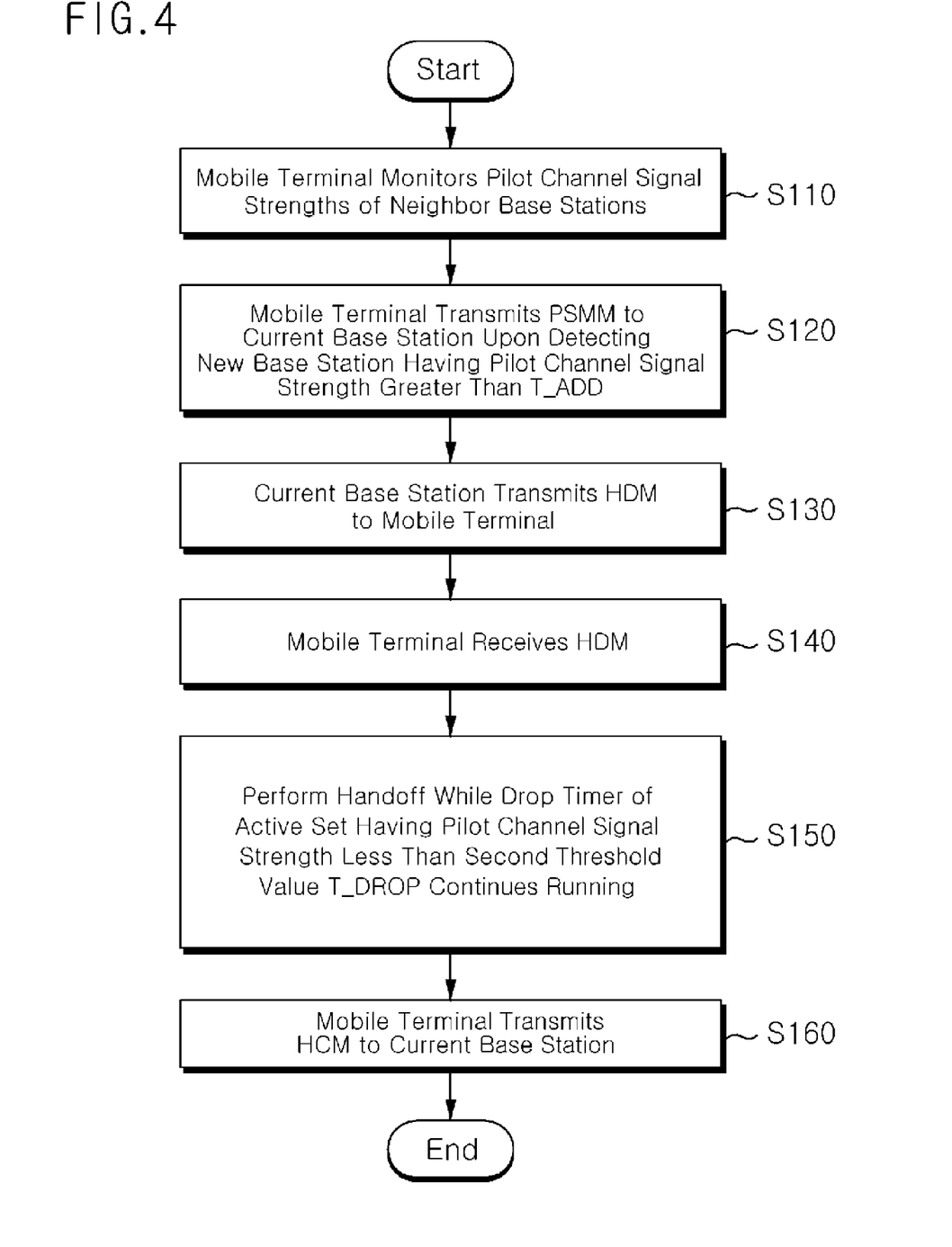
FIG. 4 is a flow chart showing a soft handoff method in accordance with the present invention.

FIG. 4 is a flow chart showing a soft handoff method in accordance with the present invention.

The soft handoff method includes analyzing periodically monitored wireless conditions of neighbor base stations, transmitting a PSMM to a current base station if a report to the current base station is needed, and receiving an HDM from the current base station. At this time, upon receiving the HDM from the current base station, a handoff drop timer of an active base station belonging to an active set having a pilot channel signal strength less than a predetermined value is allowed to continue to run rather than to be reset until the handoff drop timer expires.

First, in step S110 (monitoring step), the mobile terminal monitors the pilot channel signal strength $E_c/I_o$ of a neighbor base station, which may be at least one of base stations belonging to the active set, candidate set, neighbor set, and remaining set.

To check whether or not the mobile terminal approaches neighbor base stations, the soft handoff system 100 constantly monitors the pilot channel signal strengths $E_c/I_o$ of neighbor base stations in step S110 while the mobile terminal is powered on, regardless of whether or not the mobile terminal is in communication.

If a new base station having a pilot channel signal strength $E_c/I_o$ greater than a first threshold value T_ADD is detected in step S110, a PSMM of the new base station is transmitted to a current base station in step S120 (PSMM transmission step), and changes the new base station from the neighbor set to the candidate set.

Specifically, if it is determined that the pilot channel signal strength $E_c/I_o$ of a neighbor base station (or a new base station) is high enough (i.e., greater than the first threshold value T_ADD), the mobile terminal in communication transmits a PSMM, which is a message containing information about the pilot channel signal strength $E_c/I_o$ of the new base station, to a current base station in step 120. The mobile terminal then removes the new base station from the neighbor set and adds it to the candidate set.

If it is determined that it is necessary to perform handoff to the new base station, the current base station allocates a traffic channel to the new base station, and transmits a HDM to the mobile terminal in step S130 (HDM transmission step).

Specifically, the current base station checks the condition of the new base station based on the PSMM received from the mobile terminal. If the current base station determines that there is no problem in handoff to the new base station, the current base station allocates a new traffic channel to the new base station, and then transmits an HDM, which is a message containing a command to perform handoff, to the mobile terminal in step S130.

In step S140 (HDM reception step), the mobile terminal receives the HDM transmitted from the current base station in step S130.

After receiving the HDM in step S140, the mobile terminal performs handoff operation by changing the new base station from the candidate set to the active set in step S150 (handoff operation step).

Upon receiving the HDM, a handoff drop timer of an active base station belonging to the active set having a pilot channel signal strength $E_c/I_o$ less than a second threshold value T_DROP is not reset, but instead continues to run until the drop timer expires. Meanwhile, in the conventional soft handoff method, when the mobile terminal receives the HDM, a handoff drop timer of an active base station belonging to the active set having a pilot channel signal strength $E_c/I_o$ less than a second threshold value T_DROP is reset even though the drop timer is currently in progress. Consequently, since the drop timer is reset and restarted from zero, the mobile terminal tracks again signals of the active base station having poor signal quality for a threshold interval T_TDROP of the drop timer. Thus, it is not possible to immediately terminate a call connection to the active base station having poor signal quality. However, according to the present invention, upon receiving the HDM, the drop timer is allowed to continue to run rather than to be reset until the drop timer expires. Accordingly, it is possible to immediately terminate a call connection to the active base station having poor signal quality and improve call quality of the mobile terminal.

The mobile terminal transmits an HCM to the current base station in step S160 (HCM transmission step) after the mobile terminal performs handoff operation in step S150.

In other words, if the mobile terminal completes handoff operation in step S150, the mobile terminal transmits an HCM, which indicates that handoff operation has been completed, to the current base station in step S160.

Accordingly, when the mobile terminal receives an HDM, which is a message containing a command to perform handoff, from the current base station in a traffic state, the soft handoff system 100 allows the handoff drop timer of an active base station in the active set having poor signal quality to continue to run rather than to be reset, thereby making it possible to immediately terminate a call connection to the active base station having poor signal quality and improve call quality of the mobile terminal.

According to another embodiment of the present invention, in step S150, while traffic channels are established between a mobile terminal and each of current and new base stations by performing handoff operation, a drop timer of the current base station is started when the pilot channel signal strength $E_c/I_o$ of the current base station falls below the second threshold value T_DROP.

Specifically, when the mobile terminal receives the HDM, traffic channels are established between the mobile terminal and each of the current and new base stations. In this case, the mobile terminal constantly monitors the pilot channel signal strength $E_c/I_o$ of each of the current and new base stations. If it is determined that the pilot channel signal strength $E_c/I_o$ of the current base station is low enough (i.e., lower than the second threshold value T_DROP), the mobile terminal starts the drop timer of the current base station.

The drop timer of the current base station is used to determine whether or not the pilot channel signal strength $E_c/I_o$ of the current base station remains below the second threshold value T_DROP for a threshold interval T_TDROP.

According to another embodiment of the present invention, in step S150, if the pilot channel signal strength $E_c/I_o$ of the current base station remains below the second threshold value T_DROP for the threshold interval T_TDROP, a PSMM is transmitted to the current base station.

Specifically, the mobile terminal determines whether or not the pilot channel signal strength $E_c/I_o$ of the current base station remains below the second threshold value T_DROP for the threshold interval T_TDROP. If the pilot channel signal strength $E_c/I_o$ of the current base station remains below the second threshold value T_DROP for the threshold interval T_TDROP, the mobile terminal transmits a PSMM, which is a message containing information about the pilot channel signal strength $E_c/I_o$ of the new base station, to the current base station. Upon receipt of the PSMM, the current base station determines that the mobile terminal no longer requires a traffic channel established between the mobile terminal and the current base station, and then transmits an HDM, which is a message containing a command to perform handoff, to the mobile terminal after removing the traffic channel.

According to another embodiment of the present invention, in step S150, the mobile terminal receives the HDM from the current base station which has removed the traffic channel established between the mobile terminal and the current base station according to the PSMM, transmits an HCM to the new base station, and establishes a traffic channel with the new base station, thereby completing handoff to the new base station.

Specifically, in step S150, upon receipt of the HDM from the current base station, the mobile terminal removes the traffic channel established between the current base station and the mobile terminal and transmits an HCM to the new base station, thereby completing handoff to the new base station. Consequently, a traffic channel assigned to the mobile terminal is switched from the current base station to the new base station, thereby completing the entire handoff process.

As apparent from the above description, the present invention provides a soft handoff operation system, a mobile terminal equipped with the system, and a soft handoff method, which have the following features and advantages. That is, when the mobile terminal receives an HDM, which is a message containing a command to perform handoff, from the current base station in a traffic state, the soft handoff system 100 allows the handoff drop timer of an active base station in the active set having poor signal quality to continue to run rather than to be reset, thereby making it possible to immediately terminate a call connection to the active base station having poor signal quality and improve call quality of the mobile terminal.

While the present invention has been described with reference to exemplary embodiments thereof, it will be understood by those skilled in the art that various changes in form and details may be made therein without departing from the scope of the present invention as defined by the following claims.

What is claimed is:

1. A soft handoff system for a mobile terminal, the system to analyze periodically monitored wireless conditions of neighbor base stations, to transmit a PSMM (Pilot Strength Measurement Message) to a current base station when a condition arises that needs reporting to the current base station, and to receive an HDM (Handoff Direction Message) from the current base station, wherein upon receiving the HDM from the current base station, the system allows a handoff drop timer of an active base station belonging to an active set having a pilot channel signal strength less than a predetermined value to continue running rather than to be reset until the handoff drop timer expires.

2. The system of claim 1, comprising:
a monitoring unit to monitor pilot channel signal strengths of neighbor base stations;
a PSMM transmit unit to transmit a PSMM of a new base station to the current base station when a pilot channel signal strength of the new base station detected by the monitoring unit is greater than a first threshold value T_ADD, and to change the new base station from a neighbor set to a candidate set;
an HDM receive unit to receive an HDM from the current base station which has allocated a traffic channel to the new base station according to the PSMM;
a handoff unit to perform handoff operation by changing the new base station from the candidate set to the active set when receiving the HDM through the HDM receive unit, wherein the handoff unit allows a handoff drop timer of an active base station belonging to the active set having a pilot channel signal strength less than a second threshold value T_DROP to continue running rather than to be reset until the drop timer expires;
an HCM (Handoff Completion Message) transmit unit to transmit an HCM to the current base station when handoff operation is performed by the handoff unit; and
a control unit to control the overall operation of the system.

3. The system of claim 2, wherein while traffic channels are established between the mobile terminal and each of the current and new base stations by performing handoff operation, the handoff unit starts a drop timer of the current base station when the pilot channel signal strength of the current base station falls below the second threshold value T_DROP.

4. The system of claim 3, wherein when the pilot channel signal strength of the current base station remains below the second threshold value T_DROP for a threshold interval T_TDROP of the drop timer of the current base station, the handoff unit transmits a PSMM to the current base station.

5. The system of claim 4, wherein the handoff unit receives the HDM from the current base station which has removed a traffic channel established between the current base station and the mobile terminal according to the PSMM, transmits an HCM to the new base station, and establishes a traffic channel with the new base station.

6. The system of claim 2, wherein the neighbor base stations whose pilot channel signal strengths are monitored by the monitoring unit belong to the active set.

7. The system of claim 2, wherein the neighbor base stations whose pilot channel signal strengths are monitored by the monitoring unit belong to the candidate set.

8. A mobile terminal equipped with a soft handoff system to analyze periodically monitored wireless conditions of neighbor base stations, to transmit a PSMM (Pilot Strength Measurement Message) to a current base station when a condition arises that needs reporting to the current base station, and to receive an HDM (Handoff Direction Message) from the current base station, wherein upon receiving the HDM from the current base station, the soft handoff system allows a handoff drop timer of an active base station belonging to an active set having a pilot channel signal strength less than a predetermined value to continue running rather than to be reset until the handoff drop timer expires.

9. The mobile terminal of claim 8, wherein the soft handoff system comprises:
- a monitoring unit to monitor pilot channel signal strengths of neighbor base stations;
- a PSMM transmit unit to transmit a PSMM of a new base station to the current base station when a pilot channel signal strength of the new base station detected by the monitoring unit is greater than a first threshold value T_ADD, and to change the new base station from a neighbor set to a candidate set;
- an HDM receive unit to receive an HDM from the current base station which has allocated a traffic channel to the new base station according to the PSMM;
- a handoff unit to perform handoff operation by changing the new base station from the candidate set to the active set when receiving the HDM through the HDM receive unit, wherein the handoff unit allows a handoff drop timer of an active base station belonging to the active set having a pilot channel signal strength less than a second threshold value T_DROP to continue running rather than to be reset until the drop timer expires;
- an HCM (Handoff Completion Message) transmit unit to transmit an HCM to the current base station when handoff operation is performed by the handoff unit; and
- a control unit to control the overall operation of the system.

10. The mobile terminal of claim 9, wherein while traffic channels are established between the mobile terminal and each of the current and new base stations by performing handoff operation, the handoff unit starts a drop timer of the current base station when the pilot channel signal strength of the current base station falls below the second threshold value T_DROP.

11. The mobile terminal of claim 10, wherein when the pilot channel signal strength of the current base station remains below the second threshold value T_DROP for a threshold interval T_TDROP of the drop timer of the current base station, the handoff unit transmits a PSMM to the current base station.

12. The mobile terminal of claim 11, wherein the handoff unit receives the HDM from the current base station which has removed a traffic channel established between the current base station and the mobile terminal according to the PSMM, transmits an HCM to the new base station, and establishes a traffic channel with the new base station.

13. The mobile terminal of claim 9, wherein the neighbor base stations whose pilot channel signal strengths are monitored by the monitoring unit belong to the active set.

14. The mobile terminal of claim 9, wherein the neighbor base stations whose pilot channel signal strengths are monitored by the monitoring unit belong to the candidate set.

15. A soft handoff method for a mobile terminal, in which periodically monitored wireless conditions of neighbor base stations are analyzed, a PSMM (Pilot Strength Measurement Message) is transmitted to a current base station when a condition arises that needs reporting to the current base station, and an HDM (Handoff Direction Message) received from the current base station, wherein upon receiving the HDM from the current base station, the mobile terminal allows a handoff drop timer of an active base station belonging to an active set having a pilot channel signal strength less than a predetermined value to continue running rather than to be reset until the handoff drop timer expires.

16. The method of claim 15, comprising the steps of:
- monitoring pilot channel signal strengths of neighbor base stations by the mobile terminal;
- transmitting a PSMM of a new base station to the current base station when a pilot channel signal strength of the new base station detected by the mobile terminal is greater than a first threshold value T_ADD, and changing the new base station from a neighbor set to a candidate set;
- transmitting an HDM from the current base station to the mobile terminal after the current base station checks the condition of the new base station based on the PSMM received from the mobile terminal and allocates a traffic channel to the new base station if it is determined that there is no problem in handoff to the new base station;
- receiving the HDM from the current base station by the mobile terminal;
- performing handoff operation by changing the new base station from the candidate set to the active set by the mobile terminal having received the HDM from the current base station, wherein the mobile terminal allows a handoff drop timer of an active base station belonging to an active set having a pilot channel signal strength less than a second threshold value T_DROP to continue running rather than to be reset until the drop timer expires; and
- transmitting an HCM (Handoff Completion Message) from the mobile terminal to the current base station when handoff operation is performed by the mobile terminal.

17. The method of claim 16, wherein the step of performing handoff operation further comprises starting a drop timer of the current base station when the pilot channel signal strength of the current base station falls below the second threshold value T_DROP, while traffic channels are established between the mobile terminal and each of the current and new base stations by performing handoff operation.

18. The method of claim 17, wherein the step of performing handoff operation further comprises transmitting a PSMM from the mobile terminal to the current base station when the pilot channel signal strength of the current base station remains below the second threshold value T_DROP for a threshold interval T_TDROP of the drop timer of the current base station.

19. The method of claim 18, wherein the step of performing handoff operation further comprises receiving the HDM from the current base station which has removed a traffic channel established between the current base station and the mobile terminal according to the PSMM, transmitting an HCM to the new base station, and establishing a traffic channel with the new base station.

20. The method of claim 16, wherein in the step of monitoring, the neighbor base stations whose pilot channel signal strengths are monitored by the mobile terminal belong to the active set.

21. The method of claim 16, wherein in the step of monitoring, the neighbor base stations whose pilot channel signal strengths are monitored by the mobile terminal belong to the candidate set.

* * * * *